Figure 1:
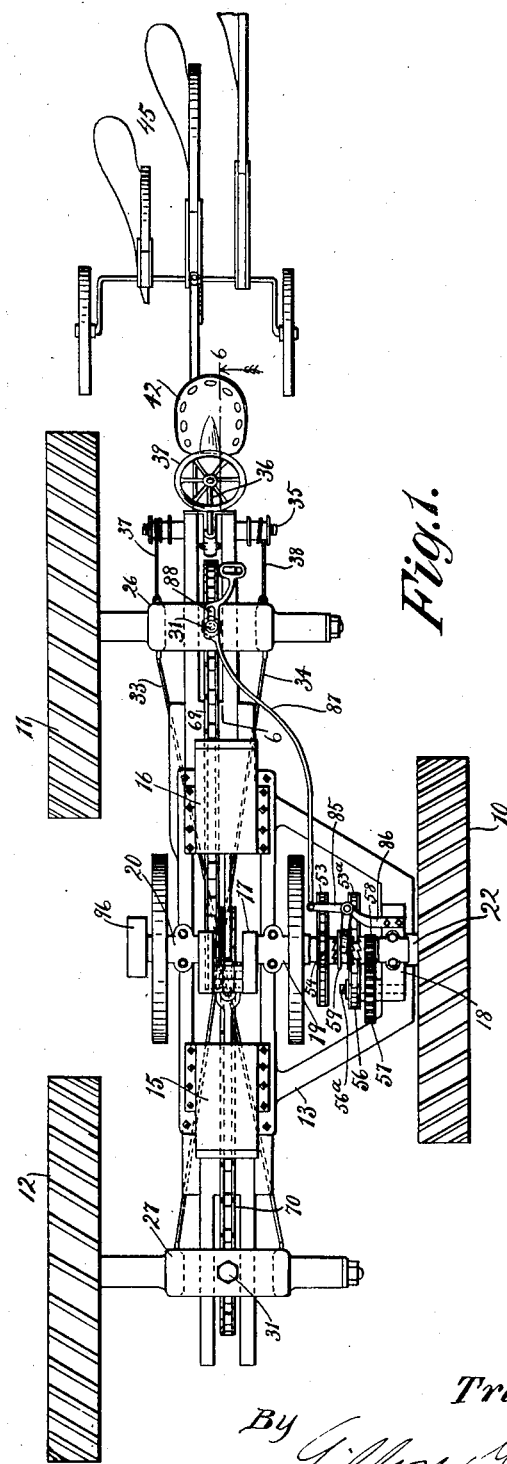

T. E. STARK.
FARM TRACTOR.
APPLICATION FILED JUNE 26, 1915.

1,347,526.

Patented July 27, 1920.
3 SHEETS—SHEET 1.

Inventor:
Truman E. Stark.
By Gillson & Gillson Attys.

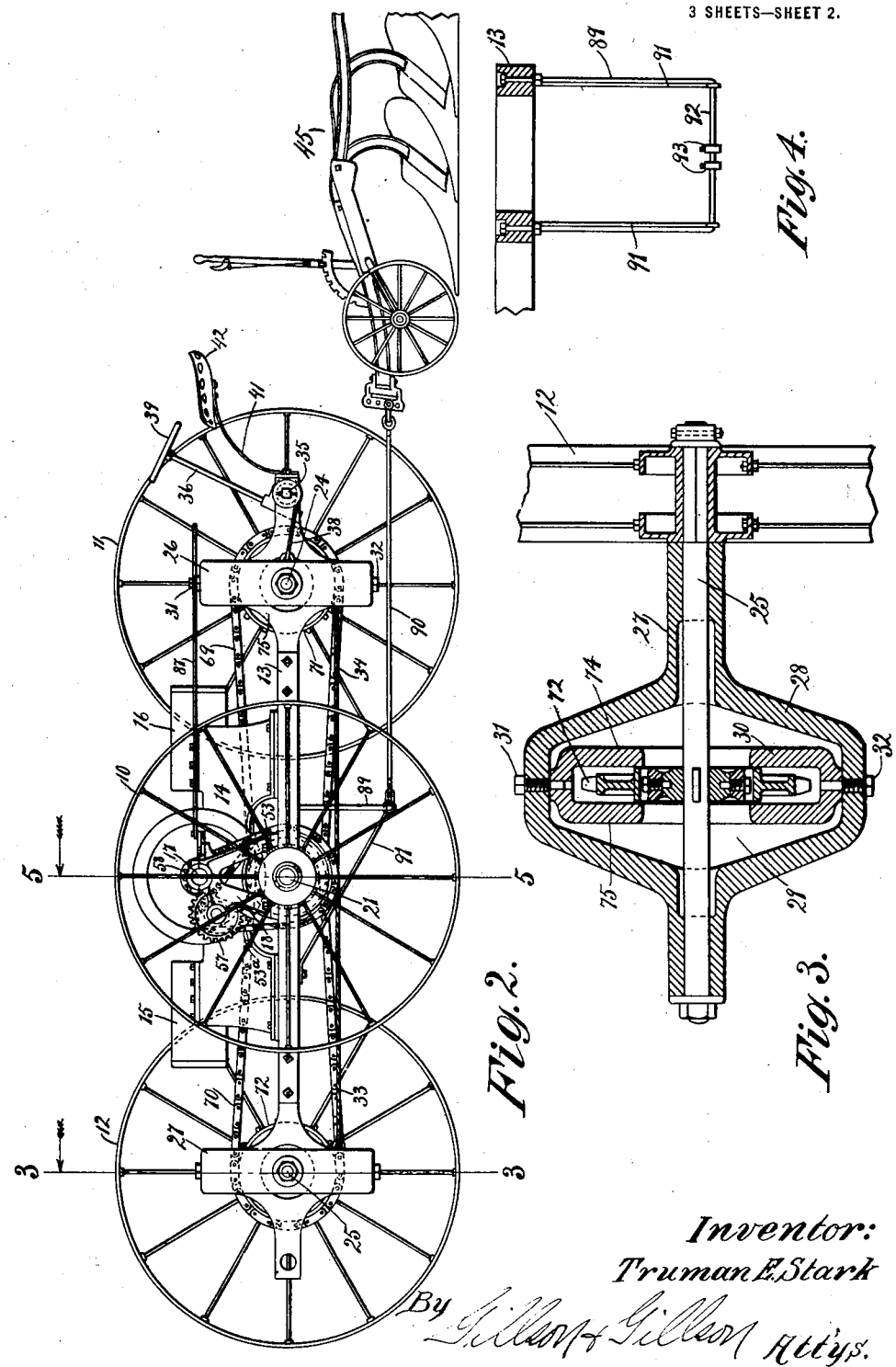

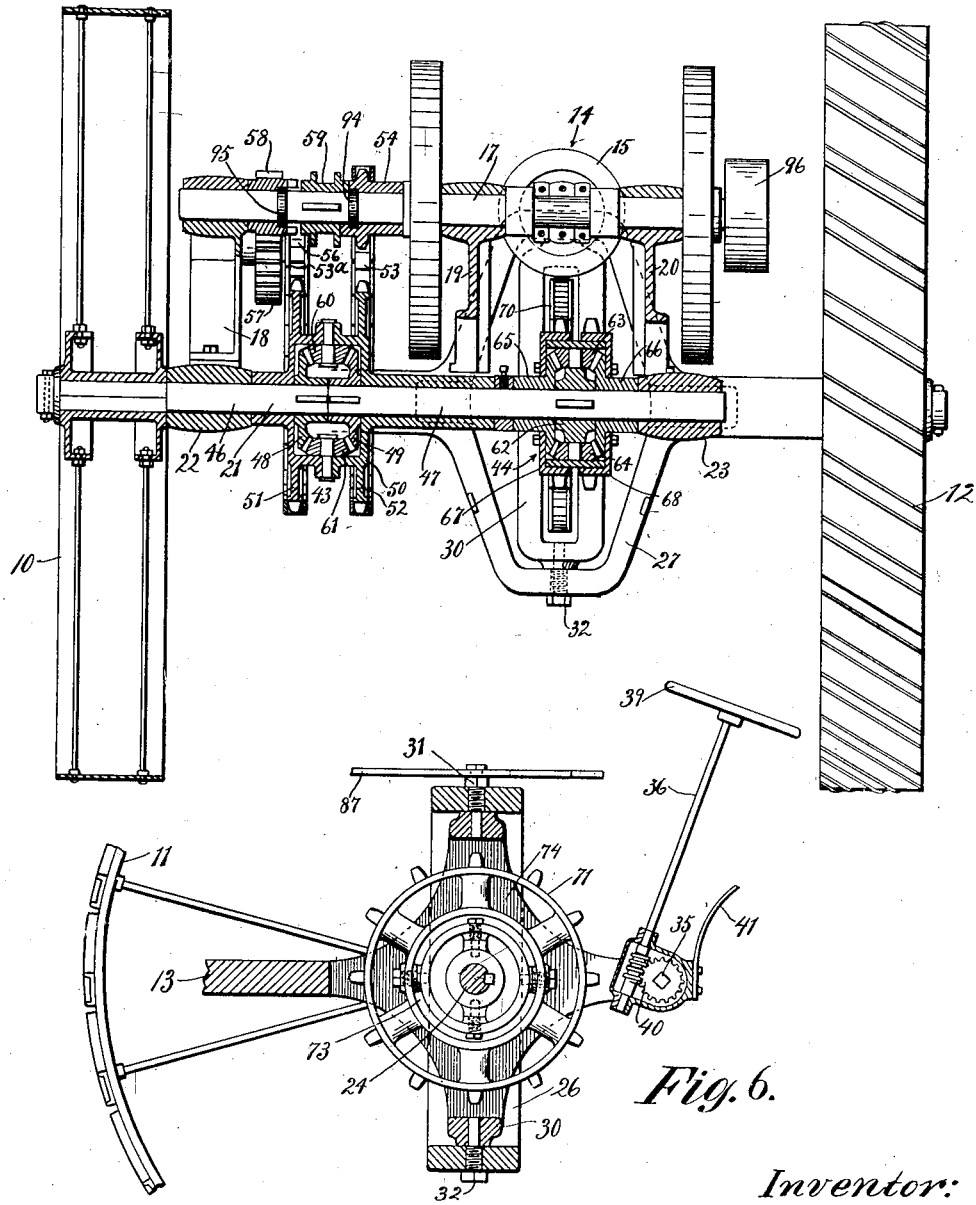

UNITED STATES PATENT OFFICE.

TRUMAN E. STARK, OF AURORA, ILLINOIS.

FARM-TRACTOR.

1,347,526.  Specification of Letters Patent.  Patented July 27, 1920.

Application filed June 26, 1915. Serial No. 36,533.

*To all whom it may concern:*

Be it known that I, TRUMAN E. STARK, a citizen of the United States, and resident of Aurora, county of Kane, and State of Illinois, have invented certain new and useful Improvements in Farm-Tractors, of which the following is a specification and which are illustrated in the accompanying drawings, forming a part thereof.

The invention relates to motor vehicles and more particularly to those which are constructed with especial reference to their use for hauling other devices. The invention accordingly has for its object to produce an improved tractor, the improvements contemplating an arrangement of parts which provides increased efficiency and facilitates the use of the tractor upon uneven ground and for making short turns.

In the accompanying drawings,

Figure 1 is a plan view of a farm tractor embodying the features of improvement provided by the invention and also showing details of a gang plow connected thereto, Fig. 2 is a side elevation of the same, Fig. 3 is a detail sectional view taken on the line 3—3 of Fig. 2, Fig. 4 is a detail end view showing a form of hitch which may be employed for the attachment of devices which are to be hauled by the tractor, Fig. 5 is a central transverse sectional view taken on the line 5—5 of Fig. 2, and Fig. 6 is a detail sectional view taken on the line 6—6 of Fig. 1.

The improved tractor is preferably constructed with three carrying wheels, as 10, 11 and 12. These wheels are associated about a main frame which is generally designated 13. As shown, the wheel 10 is located at one side of the frame 13 and at about mid length of the same while the wheels 11 and 12 are located in alinement at the other side of the frame 13 adjacent its opposite ends. A motor, as 14, is centrally mounted upon the frame 13. This motor may be of any usual form of construction but preferably comprises a pair of opposed cylinders 15, 16, and a transverse crank shaft 17. The crank shaft 17 is shown as extending horizontally over the frame 13. It is conveniently journaled in a plurality of rigid standards, as 18, 19 and 20, which rise from the frame 13.

Steering is preferably accomplished by a swinging movement of the two alined wheels 11 and 12. The wheel 10 is accordingly held against swinging movement. As shown, the wheel 10 is fixed upon one end of a transverse shaft or axle 21. This shaft extends through the frame 13 at about its mid length. It is journaled in a pair of bearing boxes 22 and 23, formed at opposite sides of the frame (Fig. 5).

The wheels 11 and 12 are each mounted upon one end of a transverse shaft 24 or 25. To permit the steering movement of these wheels each shaft 24, 25, is journaled in a swinging frame 26 or 27. The two frames 26 and 27 are of like construction, one being located adjacent each end of the machine. As shown, each frame 26, 27 is vertically enlarged intermediate its ends both above and below the line of the corresponding shaft, as 25 (Fig. 3). This vertical enlarged portion, as 28, of each of the frames 26, 27, is apertured to provide a central opening 29, through which the corresponding end portion, as 30, of the main frame 13 is extended.

Each of the frames 26 and 27 swings upon a vertical axis. To this end a pair of vertically alined pivot bolts, 31 and 32, enter the corresponding end portion 30 of the frame 13 from above and below through the top and bottom of the vertically enlarged portion 28 of the swinging frame, as 26 or 27.

A steering mechanism for controlling the swinging of the frames 26 and 27 preferably may be employed. To provide for the making of short turns this mechanism will be constructed to swing the frames 26 and 27 simultaneously and in opposite directions. As shown, the steering mechanism includes crossed tie members 33 and 34 for connecting the frames 26 and 27. The opposite movement of the two frames 26 and 27 is accomplished by uniting the two ends of the tie members 33 and 34 with the frames 26 and 27, at opposite sides of the plane of the pivot bolts 31, 32.

The steering mechanism may also include a winding shaft 35 and steering post 36. As shown, the winding shaft 35 is transversely mounted in the frame 13 in rear of the swinging frame 26. Cables 37 and 38, connected with the swinging frame 26 at opposite sides of its axis of pivotal movement are wound upon the two ends of the winding shaft 35 in opposite directions. Rotation of the winding shaft 35 accordingly serves for oppositely swinging the frames 26 and 27. When the steering post 36 is employed it is preferably mounted in the frame 13 to extend obliquely upward adjacent the winding shaft 35. The steering post 36 is shown as being provided with the usual hand wheel 39 at the top and as having a well known form of worm and wheel connection 40 with the winding shaft 35. If desired, a seat post 41 may be secured against the extreme rear end of the frame 13 to support a driver's seat 42 in a convenient position with reference to the steering post 36.

The motor 14 preferably operates upon all three of the carrying wheels 10, 11 and 12. When so constructed it is important to provide for the independent movement of the wheels at the two sides of the frame. In some instances it may also be desirable to permit independent movement of the wheels 11 and 12 with reference to each other. As shown the power transmitting mechanism includes two differential gear mechanisms generally designated 43 and 44 (Fig. 5). The differential gear mechanism 43 operates between the wheels at the two sides of the frame. The differential gear mechanism 44 operates between the wheels 11 and 12.

In the arrangement illustrated in Figs. 1 to 6, the shaft 21 consists of two sections 46, 47, and the differential gear mechanism 43 is interposed between these two sections of the shaft. As shown, the adjacent ends of the shaft sections 46 and 47 carry the oppositely facing bevel gears 48 and 49. The differential gear mechanism 43 also includes a rotatable casing 50. This casing incloses the two beveled gears 48 and 49. The intermediate beveled pinions 60 and 61 of the differential gear mechanism 43 are mounted within the case 50 in the usual manner to operate between the beveled gears 48 and 49.

In order that the machine may be driven either forward or backward provision is made for rotating the casing 50 of the differential gear mechanism 43 in either direction. For simplicity of illustration the arrangement shown provides for driving the machine at only one speed in each direction. To this end a pair of sprocket wheels 51 and 52 are formed upon the exterior of the casing 50. A sprocket chain 53 serves for connecting one of the sprockets, as 52, with a sprocket pinion 54 which is directly mounted on the crank shaft 17 of the motor. A second sprocket chain 53ª operatively connects the other sprocket wheel, as 51, with a sprocket pinion 56 which is rotatably mounted on a stub shaft 56ª. The shaft 56ª is fixed in one of the standards, as 18. The sprocket pinion 56 is rotated in the opposite direction from the crank shaft 17, as by an intermeshing gear 57, and pinion 58, one of which, as 57, is fixed to the sprocket pinion and the other of which, as 58, is mounted on the crank shaft. The sprocket pinion 54 and gear pinion 58 are both loosely mounted on the crank shaft 17 and a clutch member 59 plays between said two wheels.

The differential gear mechanism 44 comprises a hub 62 which is fixed upon the shaft section 47. This hub carries the two intermediate pinions 63, 64, and these pinions operate between a pair of beveled gears 65 and 66 both of which are loosely mounted on the shaft section 47. A sprocket wheel 67, 68, is fixed upon each of the beveled gears 65 and 66. These sprocket wheels serve for transmitting power to the carrying wheels 11 and 12, as by means of sprocket chains 69 and 70. Each of the sprocket chains 69, 70, turns over one of the sprocket wheels 67, 68, and over a sprocket wheel 71 or 72, which is coaxially mounted with the corresponding shaft 24, 25 and is rotatably connected therewith. As the sprocket wheels 71, 72 should be maintained in alinement with the sprocket wheels 67 and 68, respectively, while the shafts 24 and 25 are required to swing in a horizontal plane for steering, each of the sprocket wheels 71, 72, has a universal joint connection 73 with the corresponding shaft. The sprocket wheels 71 and 72 are conveniently held against lateral displacement if each of the end portions 30 of the frame 13 is bifurcated to form two laterally separated arms 74, 75, between which the corresponding sprocket wheel is located.

Inasmuch as the section 47 of the shaft 21 serves for transmitting power to both of the wheels 11 and 12, while the section 46 of said shaft serves only for transmitting power to the wheel 10, it follows that if the gearing is so proportioned that the shaft section 47 turns faster than the shaft section 46, the power applied to the two wheels 11 and 12 will exceed that applied to the wheel 10. This is accomplished by making the annular sprocket wheels 67, 68 of less size than the sprocket wheels 71 and 72, respectively.

During the forward movement of the machine over the ground in a straight line, all of the wheels 10, 11 and 12 rotate at the same speed but with the sprocket wheels 71 and 72 made of larger size than the sprocket wheels 67 and 68. As shown, the shaft section 47 rotates at greater speed than the shaft section 46. A larger proportion of the power which is applied to the rotatable casing 50 of the differential gear mechanism 43, is accordingly transmitted to the two wheels 11 and 12 than to the single wheel 10. Should the sprocket wheels 71 and 72 be twice the size of the sprocket wheels 67 and 68, the shaft section 47 will rotate at twice the speed of the shaft section 46, and twice the amount of power will be applied to the two wheels 11 and 12 that is applied to the wheel 10. When so constructed the motor 14 serves for rotating each of the three wheels, 10, 11 and 12 with the same power.

A bell crank shipper lever 85 is desirably engaged with the clutch member 59 for moving said clutch member between the sprocket pinion 54 and gear pinion 58. As shown, the shipper lever 85 is pivotally supported upon a bracket arm 86 which extends inwardly from the standard 18. To permit the shipping of the clutch member 59 by a driver, when occupying the seat 42, a shipper rod 87 is operatively connected with one arm of the bell crank lever 85 and extends rearwardly therefrom to a conveniently accessible position. As shown, the shipper rod 87 is guidedly supported adjacent its rear end by being provided with a slot 88 through which the pivot bolt 31 at the rear end of the machine, is extended.

In the operation of the machine for hauling a plow, as 45, the carrying wheels 11 and 12 are preferably run in a furrow (not shown) which has been left open by a preceding movement of the plow. A smooth firm track for the wheels 11 and 12 is accordingly provided by the bottom of the open furrow while the wheel 10 is engaged with the unplowed land. As shown, a depending bail 89 is secured against the under side of the frame 13 for the attachment thereto of a draft link 90. The bail 89 may be braced by suitable diagonals 91 which extend upwardly and forwardly from opposite ends of the cross member, as 92, of the bail 89 to the under side of the frame 13. Preferably the draft link 90 is held in laterally adjusted position upon the cross member 92 of the bail 89 by being engaged therewith between a pair of adjustable collars 93.

In order that the plow 45 may serve to cover the furrow (not shown) in which the wheels 11 and 12 travel, the line of draft will usually be much nearer the plane of the wheels 11 and 12 than the plane of the wheel 10. The arrangement shown and described whereby substantially the same tractive effort is applied to each of the wheels 11 and 12 as to the wheel 10 is accordingly desirable to enable the machine to maintain its course.

The form of reversing gear shown preferably includes a pair of collars 94, 95, fitted on the crank shaft 17 to prevent inward movement of the sprocket 54 and pinion 58 respectively. To permit the use of the motor 14 as a source of power for other purposes the crank shaft 17 may also be supplied with a belt pulley 96.

I claim as my invention,—

1. In a tractor, in combination, a frame, a pair of carrying wheels swingingly mounted at one side of the frame adjacent its opposite ends, said two wheels being normally in a common plane, a single carrying wheel only mounted at the other side of the frame, the last mentioned carrying wheel having a fixed axis located centrally between the axes of the two first mentioned wheels, a motor and operative driving connection between the motor and the said carrying wheels.

2. In a tractor, in combination, a frame, a bracket at each end of the frame pivotally connected thereto to swing in a horizontal plane, a pair of drive wheels each centrally located with reference to the axis of pivotal movement of one of the brackets and in a plane which is parallel to the length of the frame, a shaft journaled in each bracket and extending centrally through the corresponding drive wheel, a universal joint connecting each of said drive wheels with the corresponding one of said shafts, a carrying wheel fixed upon one end of each of the said shafts, both of said carrying wheels being located at the same side of the frame, a shaft extending transversely through the frame at its mid length, a carrying wheel fixed upon that end of the last-mentioned shaft which is at the remote side of the frame from the two first-mentioned carrying wheels, a motor, operative connection between the motor and the last-mentioned shaft, operative connection between the last-mentioned shaft and each of the said drive wheels, and steering mechanism operable to swing both of the said brackets.

3. In a tractor, in combination, a frame, a bracket pivotally connected to the frame to swing upon a vertical axis, a driving member in ring form mounted in the frame to rotate upon a fixed horizontal axis which intersects the said axis of swinging movement of the bracket, a shaft journaled in the bracket and extending centrally through the said driving member, a universal joint connecting the shaft and said driving member, and a traction wheel fixed upon the shaft.

4. In a tractor, in combination, a transversely apertured frame, a bracket having members extending over and under the frame in line with the frame aperture, alined vertical pivots connecting the said two members of the bracket with the frame, a horizontal shaft journaled in the bracket and extending through the frame aperture, the axis of the shaft intersecting the common axis of the said pivots, a driving member in ring form encircling the shaft and journaled in the frame to rotate upon a fixed horizontal axis which is transverse to the frame and intersects the said common axis of the pivots, a universal joint connecting the said driving member and the shaft, and a traction wheel carried by the bracket and operatively connected with the shaft.

5. In a tractor, in combination, a frame, a pair of rotating stub axles, one at each end of the frame, brackets in which the said axles are journaled, each of the said brackets being pivotally connected to the frame to swing in a horizontal plane, a carrying wheel mounted at one end of each of the said axles, both of the said carrying wheels being located at the same side of the frame, a third carrying wheel having a fixed axis located at the other side of the frame intermediate its ends, a pair of crossed tie members connecting the two swinging brackets, the two ends of each tie member being connected with the brackets at opposite sides of the points of pivotal connection of the brackets with the frame, a motor, and operative connection between the motor and all three of the said wheels.

6. In a tractor, in combination, a frame, two carrying wheels at one side of the frame, a third carrying wheel located at the other side of the frame, a motor, a pair of driving elements, a differential gear mechanism operatively connecting the said two driving elements and the motor, a second differential gear mechanism operatively connecting the two first mentioned carrying wheels and one of the said driving elements and connection between the other driving element and the said third carrying wheel.

7. In a tractor, in combination, a frame, a pair of steering wheels pivotally connected to the frame, another carrying wheel having a fixed axis, a motor, a pair of driving elements, a differential gear mechanism operatively connecting the said two driving elements and the motor, connection between one of the said driving elements and the said carrying wheel having a fixed axis, and a second differential gear mechanism operatively connecting the two steering wheels and the other driving element.

8. In a tractor, in combination, a frame, a pair of carrying wheels swingingly mounted at one side of the frame adjacent its opposite ends, said two wheels being normally in a common plane, a third carrying wheel having a fixed axis located at the other side of the frame intermediate its ends, a motor, a pair of driving elements, a differential gear mechanism operatively connecting the two driving elements and the motor, connection between one of the said driving elements and the said third carrying wheel and a second differential gear mechanism operatively connecting the two first mentioned carrying wheels and the other driving element.

TRUMAN E. STARK.